Aug. 11, 1953  C. A. ROESSL ET AL  2,648,445
BOOK FEED MECHANISM FOR TRIMMING MACHINES
Filed Aug. 30, 1950  6 Sheets-Sheet 1

INVENTORS:
CARL A. ROESSL
ROBERT P. FENDIUS
BY:
*Gary, Desmond & Parker*
ATTORNEYS Aug. 11, 1953  C. A. ROESSL ET AL  2,648,445
BOOK FEED MECHANISM FOR TRIMMING MACHINES
Filed Aug. 30, 1950  6 Sheets-Sheet 2

INVENTORS:
CARL A. ROESSL
ROBERT P. FENDIUS
BY:
Gary, Desmond & Parker
ATTORNEYS Aug. 11, 1953  C. A. ROESSL ET AL  2,648,445
BOOK FEED MECHANISM FOR TRIMMING MACHINES
Filed Aug. 30, 1950  6 Sheets-Sheet 3

INVENTORS:
CARL A. ROESSL
ROBERT P. FENDIUS
BY: Gary, Desmond & Parker
ATTORNEYS Aug. 11, 1953  C. A. ROESSL ET AL  2,648,445
BOOK FEED MECHANISM FOR TRIMMING MACHINES
Filed Aug. 30, 1950  6 Sheets-Sheet 4

INVENTORS:
CARL A. ROESSL
ROBERT P. FENDIUS
BY:
Gary, Desmond & Parker
ATTORNEYS Aug. 11, 1953   C. A. ROESSL ET AL   2,648,445
BOOK FEED MECHANISM FOR TRIMMING MACHINES
Filed Aug. 30, 1950   6 Sheets-Sheet 5

INVENTORS:
CARL A. ROESSL
ROBERT P. FENDIUS
BY:
Gary, Desmond & Parker
ATTORNEYS

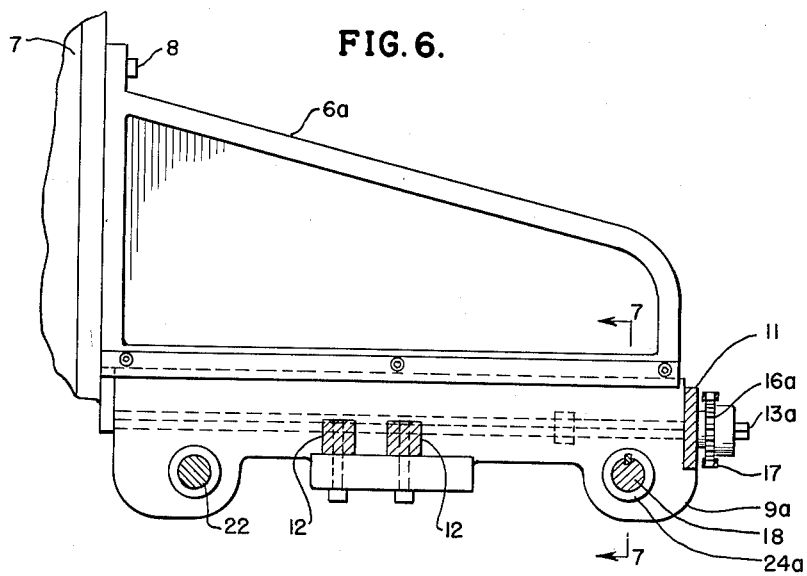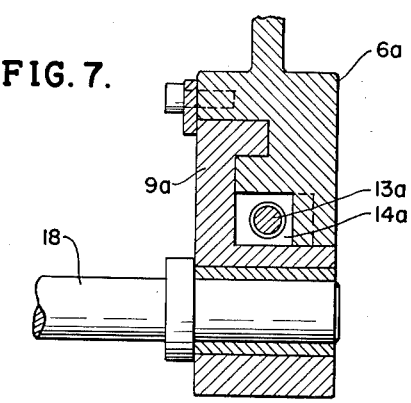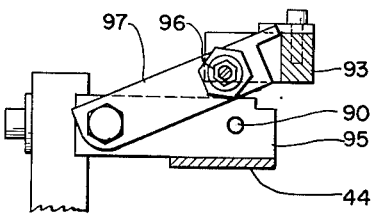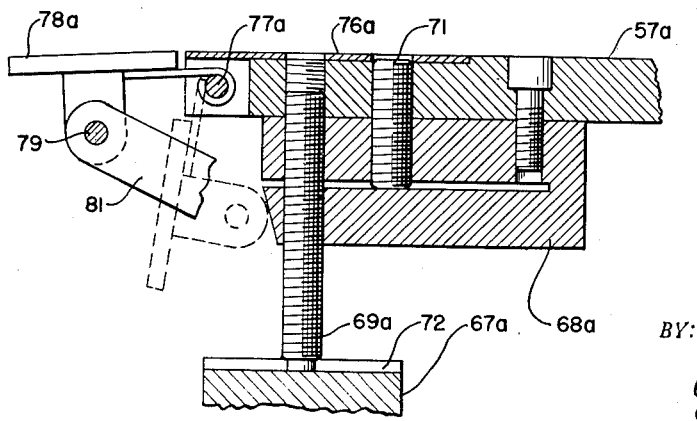

Patented Aug. 11, 1953

2,648,445

UNITED STATES PATENT OFFICE 2,648,445

BOOK FEED MECHANISM FOR TRIMMING MACHINES

Carl A. Roessl and Robert P. Fendius, Chicago, Ill., assignors to C. L. Moyer Company, Chicago, Ill., a corporation of Illinois Application August 30, 1950, Serial No. 182,278

4 Claims. (Cl. 214—8.5)

This invention relates to feed mechanisms and is more particularly concerned with the provision of a mechanism adapted for use in feeding books from a hopper into a book trimming machine, as shown and described generally in our Patent No. 2,562,950, issued August 7, 1951.

The present invention contemplates the provision of a feed mechanism in which one or more books are withdrawn from the bottom of a stack of books disposed in a hopper and then conveyed to a trimming machine by means of two sets of endless chains provided at spaced intervals with upwardly projecting push lugs.

This invention further contemplates the provision of a feed mechanism in which a stack of books positioned within the hopper is supported upon a plate mounted for vertical and angular adjustment to cause the push lugs on the endless chains to withdraw a predetermined number of books from the hopper.

This invention further contemplates the provision of a feed mechanism in which the walls of the hopper and the two sets of endless chains are adapted to be adjustably positioned to accommodate various sizes of books.

This invention embodies other novel features, details of construction and arrangement of parts which are hereinafter set forth in the specification and claims and illustrated in the accompanying drawings, wherein:

Fig. 6 is a longitudinal sectional view taken along the line 6—6 of Fig. 2.

Fig. 7 is a detail sectional view taken along the line 7—7 of Fig. 6.

Fig. 8 is a detail sectional view taken along the line 8—8 of Fig. 1.

Fig. 9 is a detail sectional view taken along the line 9—9 of Fig. 2.

Figure 1:
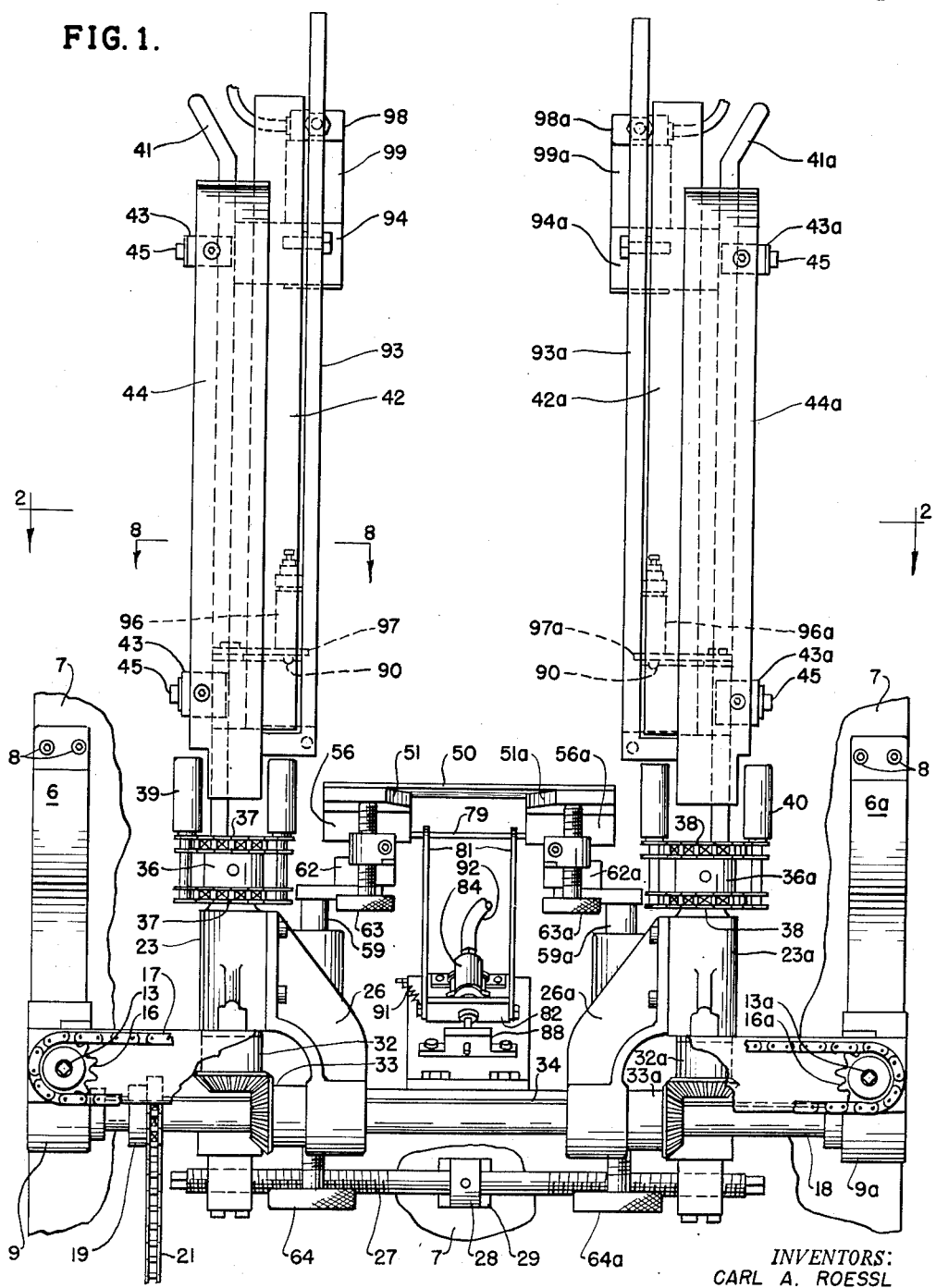
Fig. 1 is an end elevational view illustrating a feed mechanism embodying features of the present invention.

Referring now to the drawings for a better understanding of this invention, the feed mechanism is shown as comprising a pair of side frames 6—6a secured in spaced parallel relation to the frame 7 of a book trimming machine by means of bolts or cap screws 8. A pair of side rails 9—9a are slidably mounted on the lower ends of the side frames 6—6a for movement toward or away from the trimming machine and are connected to each other by means of a cross plate 11 and a pair of cross bars 12—12. A pair of adjustment screws 13—13a are journaled in the side rails 9—9a for threaded engagement with nuts 14—14a engaged to the side frames 6—6a, respectively, the screws having sprockets 16—16a secured thereto to receive an endless chain 17.

A drive shaft 18 is journaled at its ends in the side rails 9—9a and has a sprocket 19 keyed thereto to receive an endless drive chain 21 which is driven in timed relation with the book trimming machine by any suitable means (not shown). A cross rail 22 is mounted at its ends in apertures formed in the side rails 9—9a to support the forward ends of a pair of carriages 23—23a. Bearing sleeves 24—24a are journaled in apertures formed in bearing brackets 26—26a secured to the back ends of the carriages 23—23a and are adapted to slidably receive the drive shaft 18.

Figure 3:
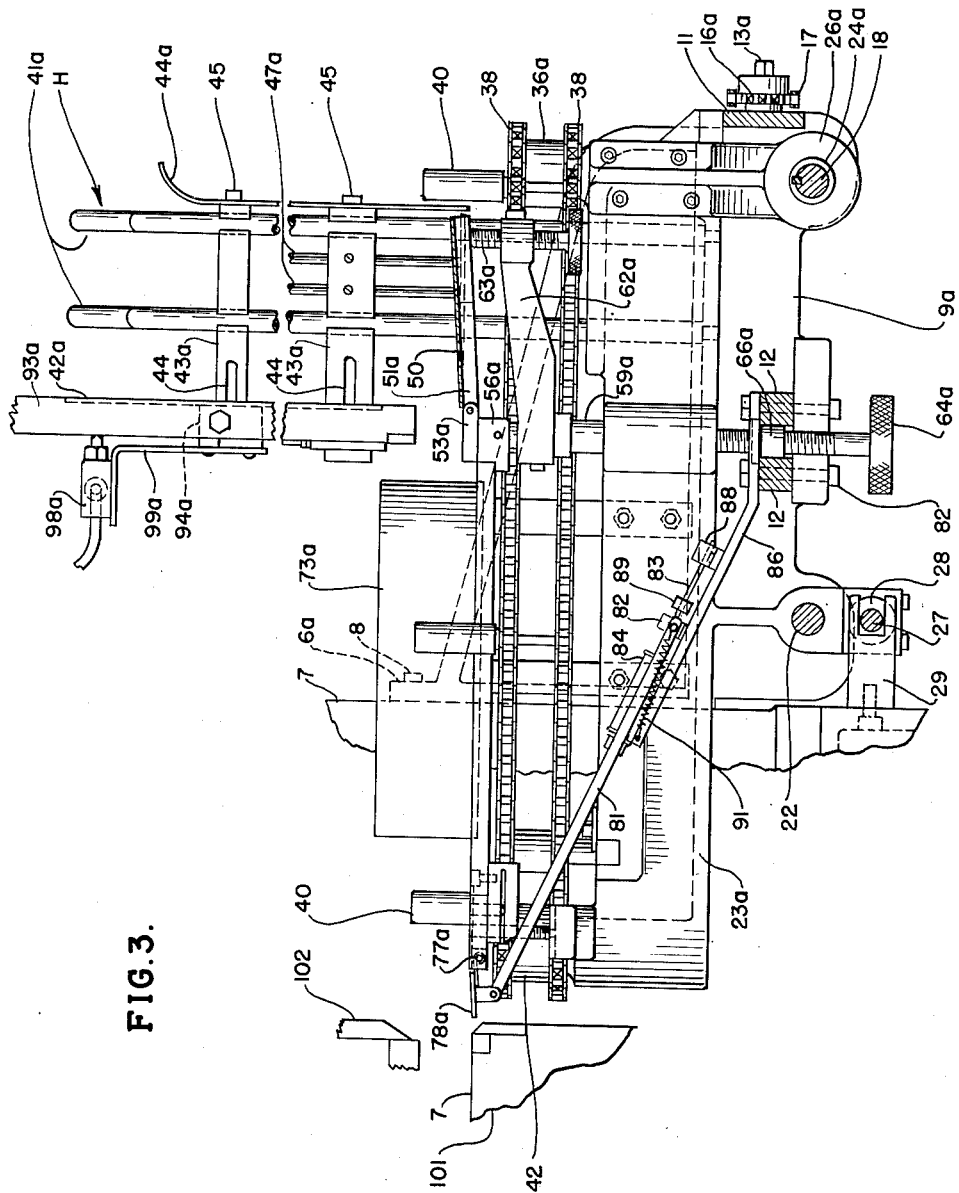
Fig. 3 is a longitudinal sectional view taken along the line 3—3 of Fig. 2.
Figure 4:
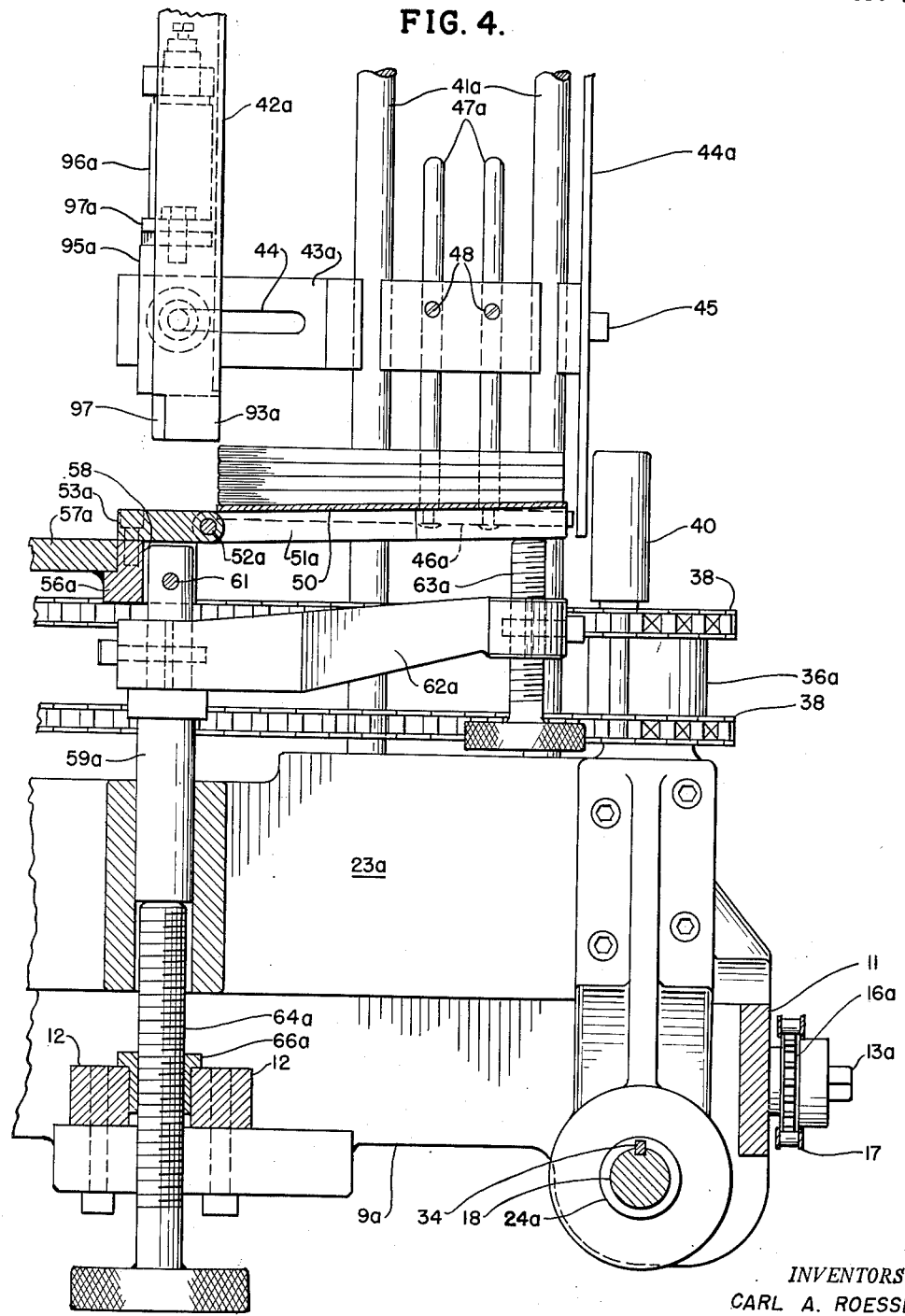
Fig. 4 is a longitudinal sectional view taken along the line 4—4 of Fig. 2.
Figure 5:
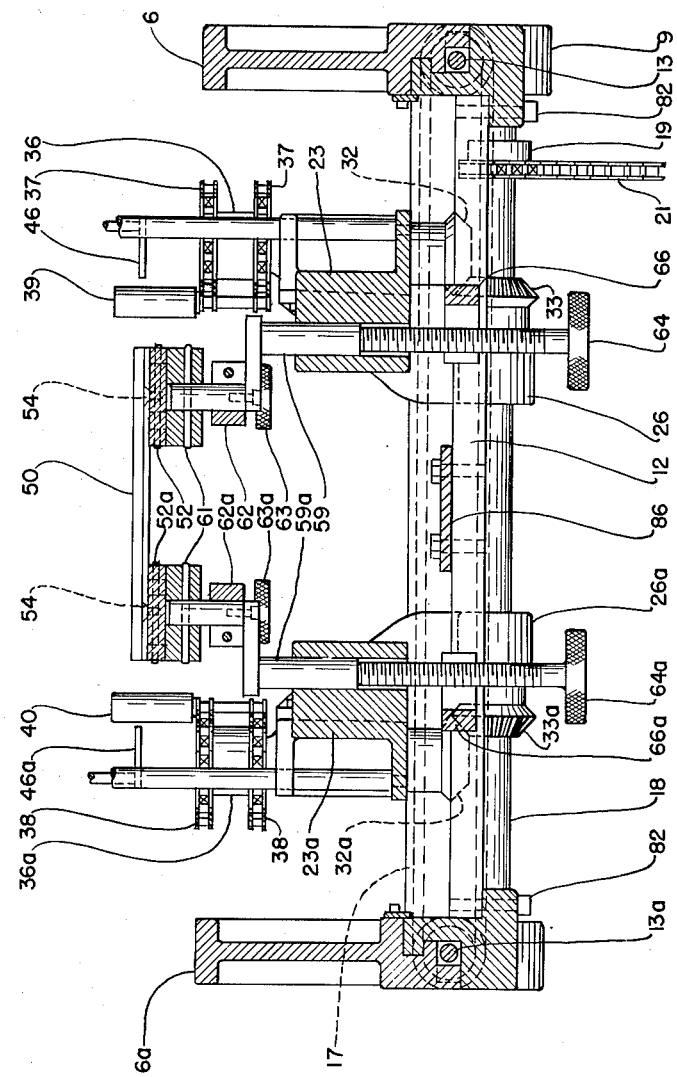
Fig. 5 is a transverse sectional view taken along the line 5—5 of Fig. 2.

An adjustment screw 27 is formed on its one end with a right hand thread and on its other end with a left hand thread, the ends of the screw being engaged in threaded apertures formed in the carriages 23—23a. A collar 28 is secured to the medial portion of the adjustment screw 27 for engagement by a bifurcated bracket 29 which serves to prevent axial movement of the screw. The bracket 29 is preferably secured to the frame 7 of the trimming machine, as illustrated in Fig. 3. It will thus be seen that rotational movement of the adjustment screw 27 acts to move the carriages 23—23a either toward or away from each other along the cross rail 22 and drive shaft 18.

Sprocket shafts 31—31a are journaled in the back ends of the carriages 23—23a and have bevel gears 32—32a keyed thereto for meshing engagement with companion bevel gears 33—33a mounted for sliding axial movement along the drive shaft 18. The bevel gears 33—33a are formed with keyways to receive a key 34 secured to the drive shaft 18. Double sprocket gears 36—36a are keyed to the upper ends of the sprocket shafts 31—31a to drive sprocket chains 37—37 and 38—38, respectively. The sprocket chains 37—37 extend around a double driven sprocket 35 journaled on a stud shaft 41 provided on the forward end of the carriage 23, and the sprocket chains 38—38 extend around a double sprocket 42 journaled on a stud shaft 43 provided on the forward end of the carriage 23a. A pair of idler sprockets 44—45 are journaled on the carriages 23—23a to remove the slack from the chains 37—37 and 38—38, respectively. Push rods 39—40 are mounted at equally spaced intervals along the sprocket chains 37—37 and 38—38 to engage and move books into the book trimming machine.

A hopper to receive a stack of books is shown as comprising a pair of rods 41—41 mounted on the carriage 23 and a pair of rods 41a—41a mounted on the carriage 23a. Front plates 42 and 42a are secured to the rods 41—41 and 41a—41a by means of brackets 43—43a which are slotted at 44 to receive bolts or screws, and back plates 44—44a are also secured to the rods by the brackets 43—43a and screws 45. A pair of plates 46—46a are connected to the lower ends or rods 47—47 and 47a—47a which extend through apertures formed in the brackets 46 and secured in position by set screws 48.

A hopper plate 50 is supported upon a pair of arms 51—51a hingedly connected at 52—52a, respectively, to hinge plates 53—53a. The hopper plate is preferably secured to the arms by means of flat head screws 54 and is adapted to be replaced by a plate of different width when books of different heighths are to be delivered to the trimming machine. The hinge plates 53—53a are secured to blocks 56—56a, respectively, which are welded to the adjacent ends of tracks 57—57a, respectively. Each block 56—56a is formed with a U-shaped recess 58 to receive the upper ends of supporting posts 59—59a having their lower ends mounted in apertures formed in the carriages 23—23a, each block being secured to its respective post by means of a cross pin 61. Brackets 62—62a are secured to the upper ends of the posts 59—59a, respectively, and have their outer ends formed with threaded apertures to receive adjustment screws 63—63a which engage the free ends of the arms 51—51a. The posts 59—59a are adjustably positioned on their carriages 23—23a by means of adjustment screws 64—64a, respectively, threaded through nuts 66—66a supported upon the cross bars 12—12.

Figure 2:
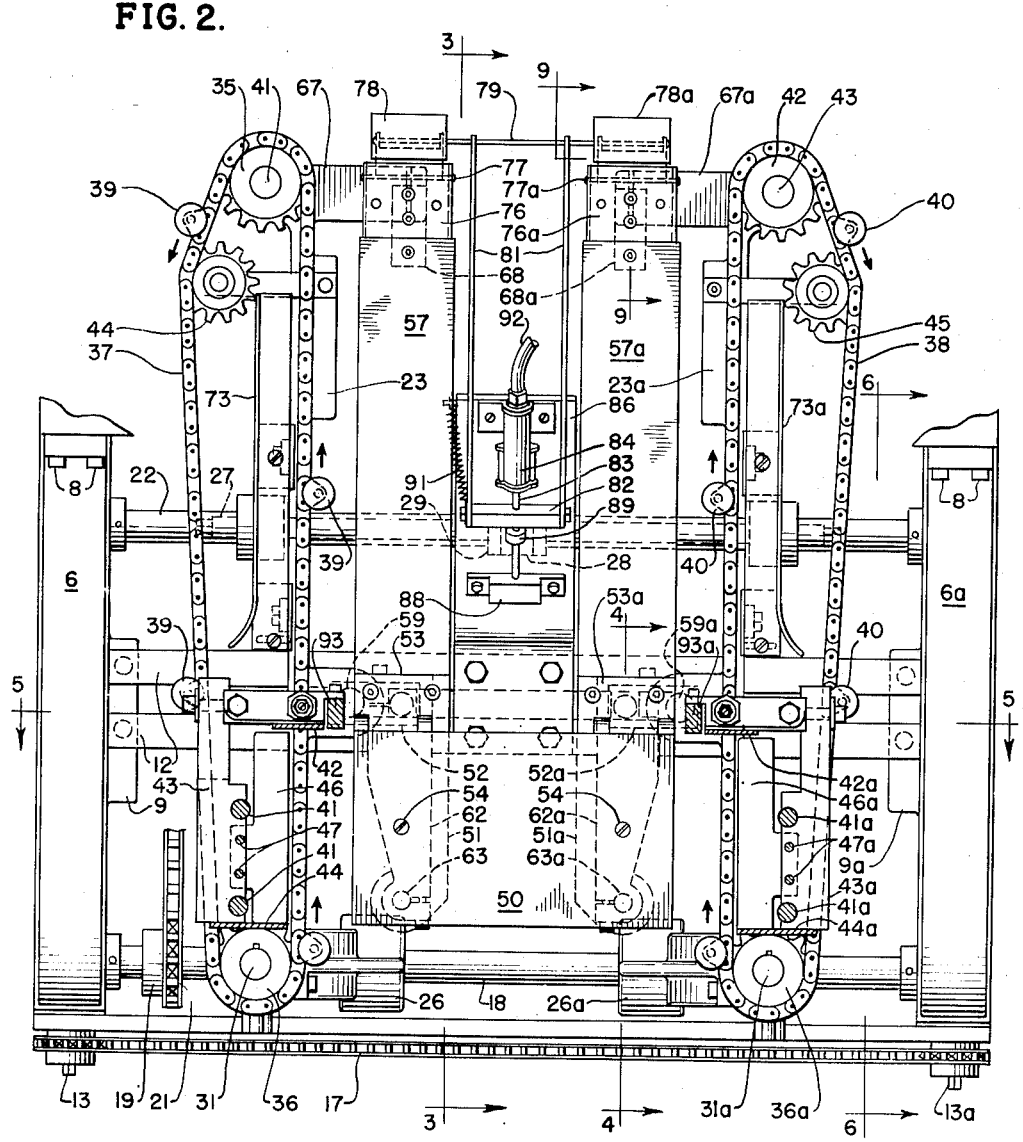
Fig. 2 is a sectional view taken along the line 2—2 of Fig. 1.

The carriages 23—23a are provided with inwardly disposed arms 67—67a to support the forward ends of the tracks 57—57a, as illustrated in Figs. 2 and 9. Split nuts 68—68a are secured to the bottom face of the tracks 57—57a to receive adjustment screws 69—69a, respectively, the screws being locked against accidental displacement by set screws 71 which act to spread the nuts. The lower ends of the adjustment screws 69—69a are disposed in longitudinally extending recesses 72 formed in the arms 67—67a, the recesses being provided to permit longitudinal movement of the tracks to prevent lateral displacement of the latter. As the books B are moved along the tracks 57—57a by the push lugs 40 on the chains 37—38, they are engaged against lateral movement by means of side guide plates 73—73a mounted on the carriages 23—23a, respectively.

Hinge plates 76—76a are secured to the forward ends of the tracks 57—57a, respectively, and are each formed with side flanges to support pivot pins 77—77a. Auxiliary tracks 78—78a are suported for pivotal movement on their respective pivot pins and are engaged for common movement by a cross pin 79. A pair of connecting links 81—81 are journaled at their upper ends on the cross pin 79 and at their lower ends on a cross bar 82, the latter being secured to a piston 83 mounted for reciprocative movement in a cylinder 84. The cylinder 84 is secured to the outer end of a bracket 86 which is mounted on the cross bars 12—12 by means of bolts 87. The outer end of the piston 83 is slidably mounted in a bearing 88 secured to the bracket 86, and a stop collar 89 is secured on the piston to engage against the bearing when the piston reaches a predetermined position. A tension spring 91 has its one end connected to the cross bar 82 and its other end connected to the bracket 86 to yieldably resist outward movement of the piston. A conduit 92 leads from the cylinder 84 to a source of fluid under pressure, the flow of fluid being controlled by a suitable valve (not shown) interposed in the conduit and operable responsive to each cutting stroke of the trimming machine to cause fluid to flow into the cylinder to actuate the piston to cause the auxiliary tracks to pivot downwardly.

A pair of switch actuating arms 93—93a are pivotally mounted on blocks 94—94a secured to the hopper front plates 42—42a, the lower ends of the arms being disposed for engagement by misaligned books moving from the hopper. Spring pressed plunger devices 96—96a are mounted on the free ends of latch arms 97—97a supported for pivotal movement on blocks 95—95a secured to the hopper front plates 42—42a, the outer ends of the spring pressed plungers being normally disposed in shallow recesses 90 formed in the blocks 95—95a to prevent accidental displacement of the arms 93—93a.

Micro-switches 98—98a are mounted on brackets 99—99a secured to the blocks 94—94a to complete an electric circuit leading from a source of current to an electric motor (not shown) employed to drive the trimming machine and feed mechanism. Pivotal movement of either arm 93 or 93a acts to actuate its respective switch to break the circuit to the motor.

In the operation of the feed mechanism thus described, a stack of books B is mounted within the hopper H and rests upon the bottom hopper plate 50 with the backs of the books adjacent the front hopper plates 42—42a. The endless chains 37—37 and 38—38 are driven in timed relation to cause the push lugs 40 on the inner flights of the chains to move along and through the bottom of the hopper H to propel one or more books from the bottom of the stack of books. It will be noted that the push lugs are arranged in transverse pairs as the lugs move under the hopper H and act to move one or more books along the tracks 57—57a, thence over the auxiliary tracks 78—78a and onto the frame 7 of a book trimming machine, indicated generally at 101. The book trimming machine may be of the type shown and described in our Patent No. 2,562,950, issued August 7, 1951, in which a first stage knife 102 moves in a vertical plane to trim the front edge of a book. It will be noted that the push lugs act to position the books for trimming by the first stage trimming knife 102.

The hopper bottom plate 50 is adjustable vertically to cause the push lugs 40 to engage a predetermined thickness of book or books. As set forth in the aforesaid pending application, the trimming machine 101 is adapted to trim a stack of two or more books, and the hopper bottom plate 50 is adjustable vertically to withdraw a predetermined number of books from the hopper by the action of each set of push lugs 40. The hopper bottom plate 50 is also adapted to be adjusted angularly by means of the adjustment screws 63—63a, as the bound backs of the books have a greater thickness than the front edges of the books. The free edge of the hopper bottom plate 50 is therefore raised to a higher level than its other end adjacent the pivot pins 52—52a.

In the event the books being withdrawn from the bottom of the hopper H become misaligned, bowed, or the like, the switch actuating arms 93—93a are pivoted in a forward direction by the misaligned books to actuate the micro-switches 98—98a and thus break the circuit to the electric motor employed to drive the trimming machine and the book feed mechanism.

After a stack of books has been trimmed along its forward edge by the knife 102 of the trimming machine 101, a control valve (not shown) is opened to direct fluid under pressure through the conduit 92 and into the cylinder 84 to move the piston 83 outwardly. Outward movement of the piston acts through the cross bar 82, connecting links 81—81, and cross rod 79 to pivot the auxiliary tracks 78—78a downwardly to permit the trimmings from the books to fall downwardly by gravity between the book feed mechanism and the frame of the trimming machine. After the trimmings have been discharged from the top of the auxiliary tracks 78—78a, the tension spring 91 acts to return the piston 83 to its inner position and to pivot the auxiliary tracks upwardly into a substantially common plane with the tracks 57—57a.

In the trimming of books of different sizes, it will be noted that the carriages 23—23a are movable toward or away from each other by means of the adjustment screw 27. Prior to adjustment of the carriages, the hopper bottom plate 50 is removed from the arms 51—51a and replaced by another bottom plate corresponding to the size of the book to be trimmed. It will be noted that each carriage 23—23a supports an endless chain, a track and one side of the hopper H whereby lateral adjustment of the carriages acts to adjust the positions of the other parts of the book feed mechanism. The carriages 23—23a are also adjustable longitudinally by means of the adjustment screws 13 and 13a which are connected for common movement by the endless chain 17. The carriages 23—23a are adjustable longitudinally to move a stack of books into proper trimming position under the first stage trimming knife 102.

While this invention has been shown in but one form, it is obvious to those skilled in the art that it is not so limited but is susceptible of various changes and modifications without departing from the spirit and scope of the claimed invention.

We claim as our invention:

1. In a mechanism of the character described, a hopper to receive a stack of books, a pair of carriages mounted in spaced parallel relation below said hopper, a pair of sprockets mounted on each carriage for rotational movement about a vertical axis, endless chains mounted on the sprockets of their respective carriages and having their inner flights only disposed to engage and move books from the hopper, track means to support a book during movement of the latter from the bottom of the hopper between said carriages, a common drive means for said endless chains to cause the latter to move books from the bottom of said hopper along said track means, push lugs mounted at a spaced intervals on said endless chains and a projecting upwardly therefrom to engage and move a book from the bottom of said hopper, means to vary the spacing between said carriages to accommodate books of different sizes, said hopper being formed in two sections with one section mounted upon each carriage, a pair of arms pivotally connected to the end of said track means, and a plate mounted upon said arms to support a stack of books disposed within said hopper.

2. In a mechanism of the character described, a hopper to receive a stack of books, a pair of carriages mounted in spaced parallel relation below said hopper, a pair of sprockets mounted on each carriage for rotational movement about a vertical axis, endless chains mounted on the sprockets of their respective carriages and having their inner flights only disposed to engage and move books from the hopper, track means to support a book during movement of the latter from the bottom of the hopper between said carriages, a common drive means for said endless chains to cause the latter to move books from the bottom of said hopper along said track means, push lugs mounted at spaced intervals on said endless chains and projecting upwardly therefrom to engage and move a book from the bottom of said hopper, means to vary the spacing between said carriages to accommodate books of different sizes, said hopper being formed in two sections with one section mounted upon each carriage, a pair of arms pivotally connected to the end of said track means, a plate mounted upon said arms to support a stack of books disposed within said hopper, and means to adjust the height of said plate relative to said endless chains.

3. In a mechanism of the character described, a hopper to receive a stack of books, a pair of carriages mounted in spaced parallel relation below said hopper, a pair of sprockets mounted on each carriage for rotational movement about a vertical axis, endless chains mounted on the sprockets of their respective carriages and having their inner flights only disposed to engage and move books from the hopper, track means to support a book during movement of the latter from the bottom of the hopper between said carriages, a common drive means for said endless chains to cause the latter to move books from the bottom of said hopper along said track means, push lugs mounted at spaced intervals on said endless chains and projecting upwardly therefrom to engage and move a book from the bottom of said hopper, means to vary the spacing between said carriages to accommodate books of different sizes, said hopper being formed in two sections with one section mounted upon each carriage, a pair of arms pivotally connected to the end of said track means, a plate mounted upon said arms to support a stack of books disposed within said hopper, and means to adjust the height and angle of said plate relative to said endless chains.

4. In a mechanism of the character described, a frame, a pair of carriages slidably mounted on said frame for movement toward and away from each other, a hopper comprising two separate side sections mounted on their respective carriages and coacting to support a stack of books in upright position, a main track mounted on each carriage, a hopper bottom plate hingedly connected to the adjacent ends of said tracks, an endless chain provided on each of said carriages and having its inner flight only disposed to coact with its companion chain to move a book from the bottom of the hopper and along said tracks, push lugs projecting upwardly at equally spaced intervals along said endless chains to engage and move books from said hopper, means to adjust the height of said hopper bottom plate relative to said push lugs, and means to adjust the angle of said hopper bottom plate relative to the plane of the inner flights of said endless chains.

CARL A. ROESSL.
ROBERT P. FENDIUS.

References Cited in the file of this patent

UNITED STATES PATENTS

| Number | Name | Date |
|---|---|---|
| 968,053 | Heldmann | Aug. 23, 1910 |
| 1,258,989 | Craig | Mar. 12, 1918 |
| 1,358,255 | Seufer et al. | Nov. 9, 1920 |
| 1,462,986 | Shaw | July 24, 1923 |
| 1,613,330 | Prescott | Jan. 4, 1927 |
| 1,720,680 | Kleineberg | July 16, 1929 |
| 1,803,973 | Medholdt | May 5, 1931 |
| 1,806,805 | Knapp | May 26, 1931 |
| 1,838,167 | Wheeler | Dec. 29, 1931 |
| 1,840,410 | Robinson | Jan. 12, 1932 |
| 1,943,444 | Knowlton | Jan. 16, 1934 |
| 2,028,410 | Rapisarda | Jan. 21, 1936 |
| 2,345,937 | Joa | Apr. 4, 1944 |
| 2,368,483 | Monroe | Jan. 30, 1945 |
| 2,378,948 | Paxton et al. | June 26, 1945 |